No. 665,242. Patented Jan. 1, 1901.
R. F. LUDLOW.
CAR COUPLING.
(Application filed Mar. 2, 1899.)
(No Model.) 3 Sheets—Sheet 1.
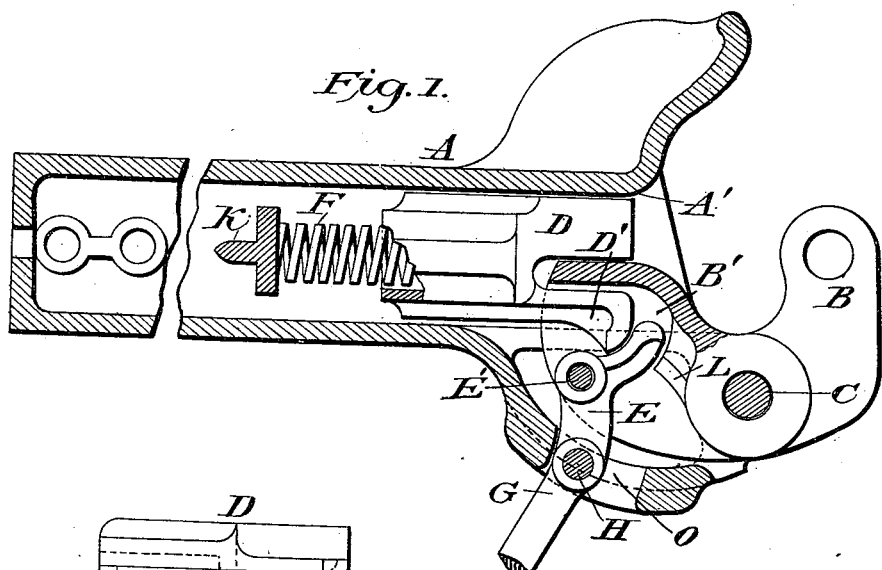
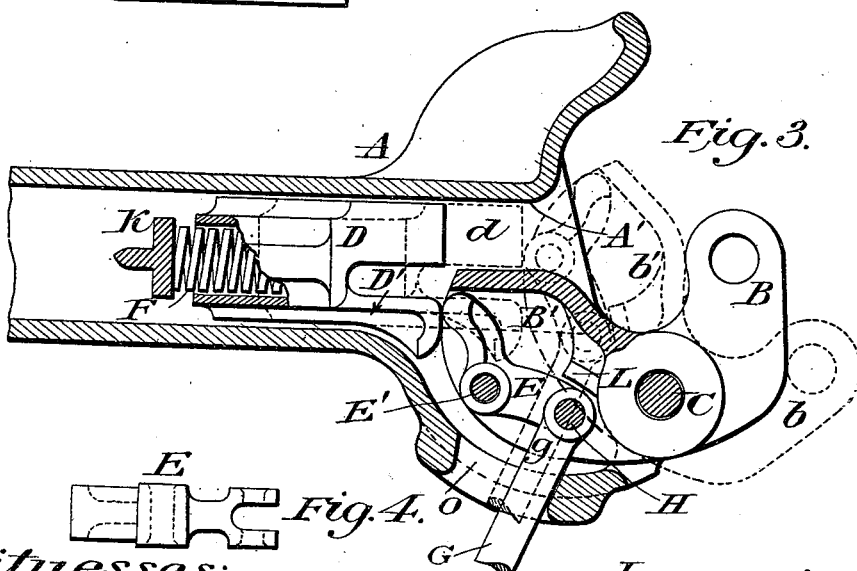
Witnesses:
B. H. Ludlow.
Alden R. Ludlow.
Inventor:
Rodney F. Ludlow

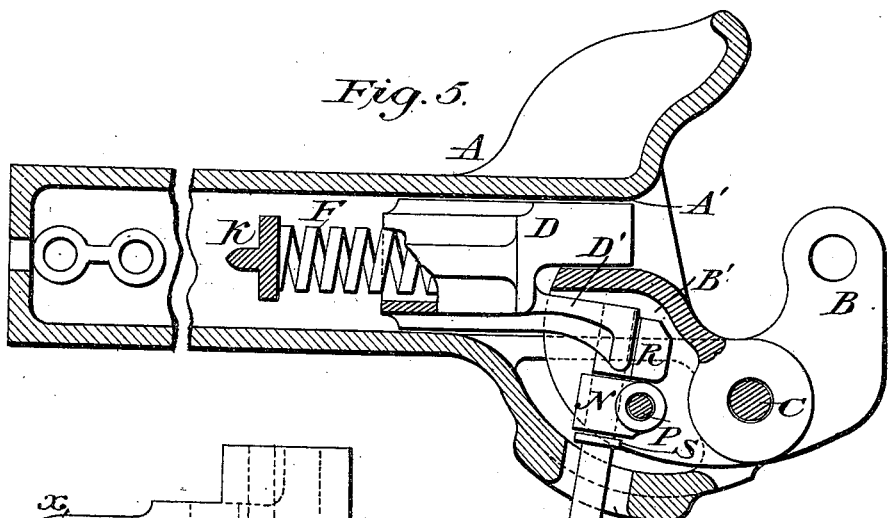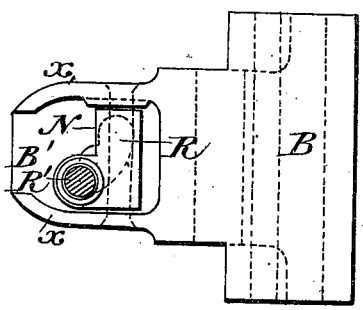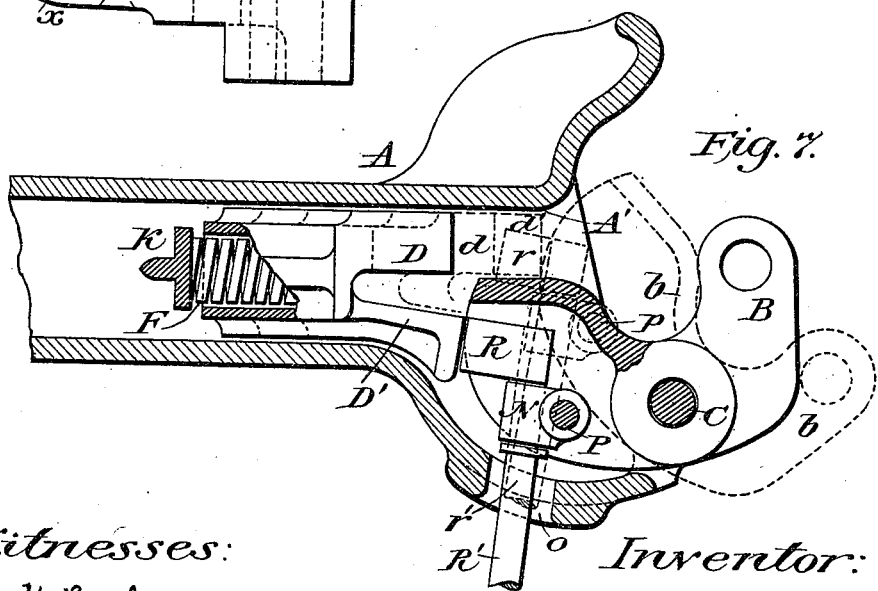

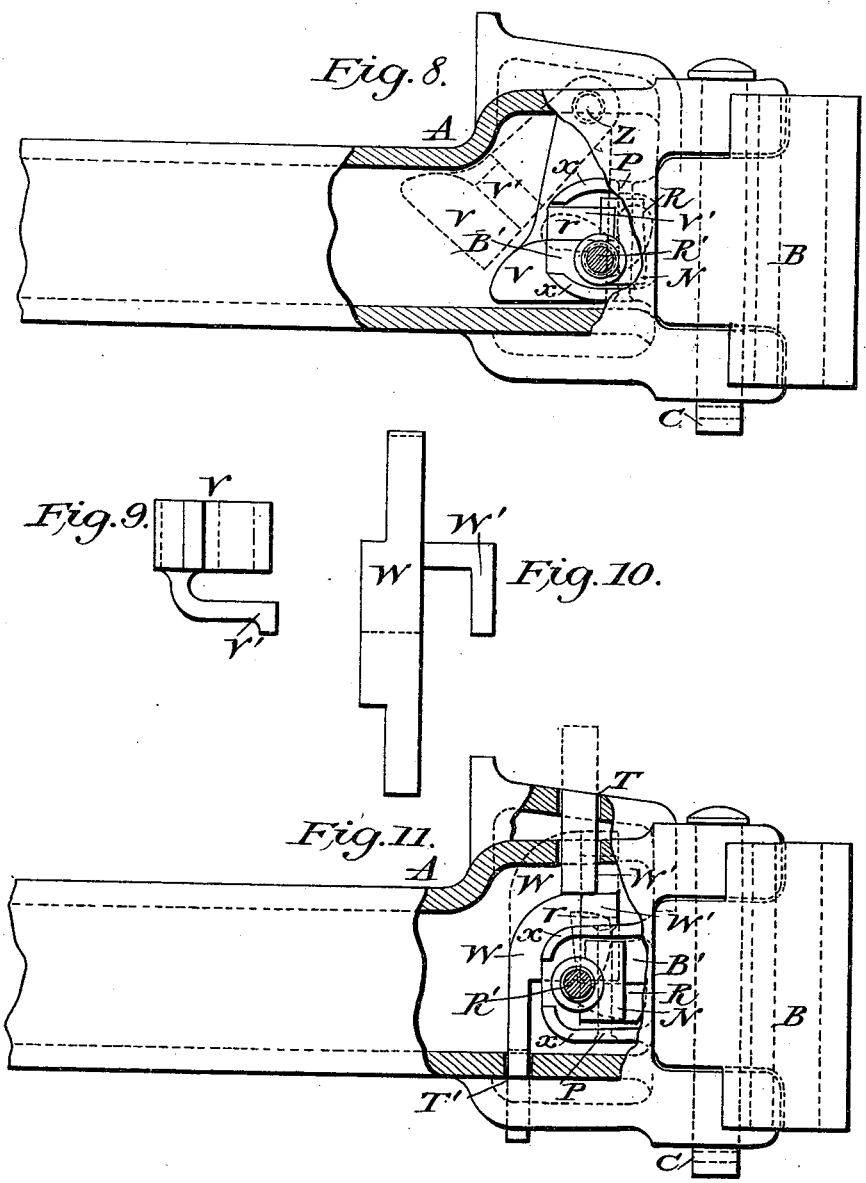

UNITED STATES PATENT OFFICE.

RODNEY F. LUDLOW, OF PHILADELPHIA, PENNSYLVANIA.

CAR-COUPLING.

SPECIFICATION forming part of Letters Patent No. 665,242, dated January 1, 1901.

Application filed March 2, 1899. Serial No. 707,536. (No model.)

*To all whom it may concern:*

Be it known that I, RODNEY F. LUDLOW, a citizen of the United States, residing at Philadelphia, in the county of Philadelphia and State of Pennsylvania, have invented certain new and useful Improvements in Car-Couplers, of which the following is a specification, reference being had to the accompanying drawings.

My invention relates to certain new and useful improvements in car-couplings in which a rotating hook or knuckle is so attached to or made part of a draw-head that the coupling is effected by the hook or knuckle rotating inwardly.

The objects of my improvements are to release the locking member of the coupler, which may be of any type or form, open the hook or knuckle, and close said hook or knuckle, all or any of these operations at the will of the operator. I attain these objects by the following devices or their equivalent, illustrated in the accompanying drawings, which I shall proceed to describe and in which like reference-letters indicate corresponding parts.

Sheet 1: Figure 1 represents a plan view of a draw-head in section and a hook or knuckle the inner arm of which is in section, and a locking member, together with the several connections of the various parts; Fig. 2, a side view of the locking member; Fig. 3, a plan view of a draw-head in section, a hook or knuckle the inner arm of which is in section, the locking member in a released position, and the knuckle by dotted lines in open position; and Fig. 4, one form of member by which the purposes of my improvements are accomplished.

The letter A designates a draw-head of any suitable construction, to which is attached in any manner a rotating knuckle B, the inner arm B' being held in a locked position by the sliding block D operating between said inner arm B' and an opposing wall A' of the draw-head. This block D is operated backward past the inner arm of the knuckle to allow the said end to swing outward, and this backward movement is effected by means of the member E, which is preferably attached to the walls of the inner arm B' of the knuckle B by the shaft E', and to the uncoupling-rod G or its equivalent by the connection at H. If the operator desires to release the knuckle or unlock it, he may do so by pushing the uncoupling-lever G until the member E takes the position as shown in Fig. 3, which movement of the said member E causes the locking-block D to take such position as will admit of the inner arm B' swinging outward. The releasing member E or its equivalent being attached to the inner arm B' of the knuckle B, the knuckle may be pushed open to any position desired, said operation being performed by and through the uncoupling-lever or its equivalent, the releasing member E or its equivalent, and the inner arm B' of the knuckle B. If the knuckle is open to any position, it may be partly closed or closed to a locked position by the operator by and through the uncoupling-lever, the releasing member, and the inner arm of the knuckle.

Sheet 2: Fig. 5 is a plan view of draw-head in section, a hook or knuckle the inner arm of which is in section, a locking member, a releasing member, and the several connections of the various parts. Fig. 6 is a side view of the hook or knuckle, showing the location in this particular construction of the releasing member; and Fig. 7 is like Fig. 5 except that the positions of the locking-block, releasing member, and knuckle (in dotted lines) are changed. In this form of my construction the draw-head, knuckle, and sliding block are the same as in Fig. 1, Sheet 1, but the releasing member R is preferably made a part of the uncoupling-shaft R', which has a bearing in the rotating member or box N, attached to the inner arm B' of the knuckle B, preferably by the shaft P, and when it is desired to unlock the inner arm of the knuckle the operator revolves the uncoupling-lever or its equivalent until the releasing member R takes such position as will push back the locking-block D far enough to allow the inner arm of the knuckle to swing outward. If the operator desires, he may push the knuckle to any open position, and if open to any position he may close the knuckle part way or to a locked position by and through the uncoupling-lever R', the box-bearing or its equivalent, and the inner arm of the knuckle.

Sheet 3: Fig. 8 shows a side view of a draw-head and knuckle with a portion of the side wall of the draw-head broken away, the releasing member, the locking member, and the various connections. Fig. 9 is a top view of the locking member. The draw-head A, the knuckle B, and the inner arm B' are the same as in Figs. 1 and 5; but the locking member in this construction is a pawl or pendant and preferably attached to the draw-head by the connection at Z The releasing member R and the shaft or uncoupling-lever R' and the box-bearing N are the same construction as in Figs. 5, 6, and 7. When the uncoupling-lever R' is revolved, the releasing member R comes in contact with the arm V' of the pawl or pendant V and swings this pawl or pendant to such position as to allow the inner arm B' of the knuckle B to rotate outward, when the operator may push the knuckle open to any position desired, or if open he may partially close or close the knuckle to a locked position. Any one or more or all of these operations may be performed by and through the uncoupling-lever or its equivalent, the box-bearing or its equivalent, and the inner arm of the knuckle.

Sheet 3: Fig. 10 shows another form of locking device and is designated by the letter W, and the arm of said locking member is designated, by W'. Fig. 11 is similar to Fig. 8, and all the parts are the same excepting the locking member. If the uncoupling-shaft is revolved, the releasing member R will come up under the arm W' of the locking member W and raise said member to a position that will release the inner arm of the knuckle and allow its being rotated outward, when the operator may open the knuckle to any position desired by and through the uncoupling-lever, the box-bearing, and the inner arm of the knuckle or their equivalents. If the knuckle is open to any position it may be partially closed or closed to a coupled or locked position at the will of the operator.

I do not claim any particular device for releasing the locking member and the opening of the knuckle to any position desired, or if the knuckle is open the closing of same to any position desired, as the same can be accomplished in various ways.

What I do claim, and desire to secure by Letters Patent, is—

In a car-coupling composed of a draw-head and a rotating hook or knuckle attached thereto, the combination with said hook or knuckle at any point in the rear of its pivotal connection with the draw-head of means substantially as described for the releasing of the locking device, and the opening or closing of the hook or knuckle to any position desired.

In testimony whereof I affix my signature in presence of two witnesses.

RODNEY F. LUDLOW.

Witnesses:
WILLIAM M. STEWART, Jr.,
GEORGE STERNER.